LEGEND:

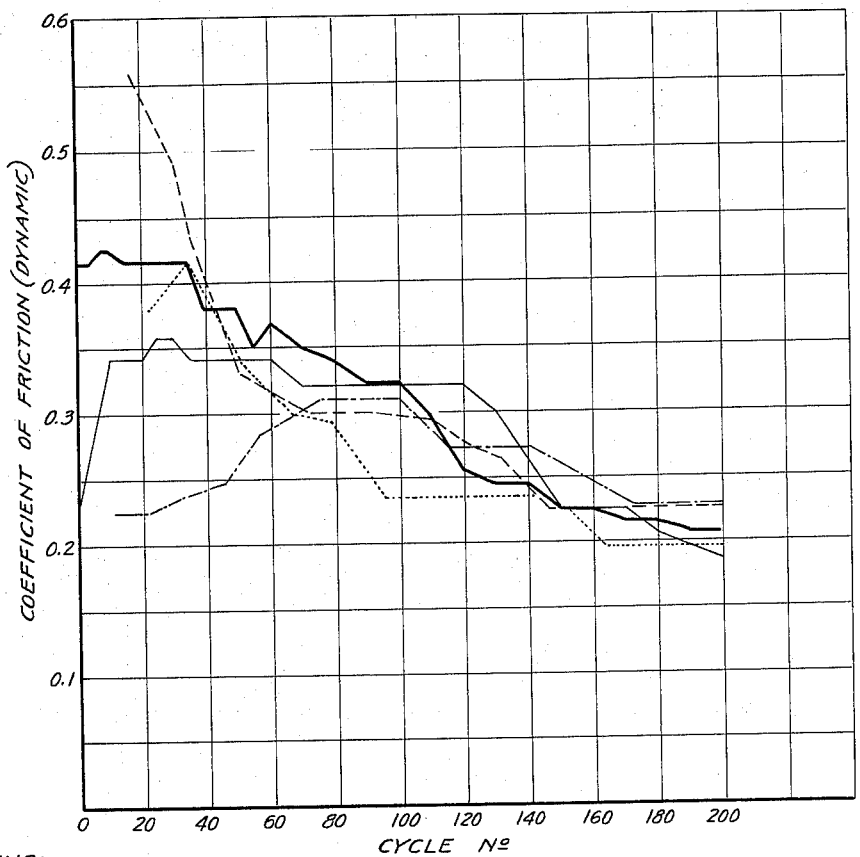

......... Sintered powdered bronze comprising 90% Cu and 10% Sn.
Density - 6.23 gms./c.c. avg.

— ·· — Sintered powdered bronze comprising 90% Cu and 10% Sn, oxidized at 1200° F. for 2 hours in air.
Density - 6.47 gms./c.c. avg.

— — — Sintered powdered bronze comprising 90% Cu and 10% Sn, and re-sintered at 1200° F. for 2 hour in Argon.
Density - 6.42 gms./c.c. avg.

——— Sintered powdered bronze comprising 90% Cu. and 10% Sn. oxidized at 1200° F. for 2 hours in air. Coined at approx. 50 Tons/in.² Surface oxidized at 1200°F. for 20 mins.
Density - 8.1 gms./c.c. avg.

——— Sintered powdered bronze comprising 90% Cu and 10% Sn. oxidized at 1200° F. for 2 hours in air, coined at approx. 80 Tons/in.² and surface oxidized at 1200° F. for 20 mins.
Density - 8.55 gms./c.c. avg.

Inventors:
Robert W. Halberg and
Roger S. Hutton

United States Patent Office 3,214,271
Patented Oct. 26, 1965

3,214,271
METHOD OF MAKING FRICTION BODIES
Robert W. Halberg, Des Plaines, Ill., and Roger S. Hutton, Sacramento, Calif., assignors to Borg-Warner Corporation, Chicago, Ill., a corporation of Illinois
Filed Mar. 27, 1963, Ser. No. 268,262
8 Claims. (Cl. 75—206)

This invention relates to articles formed of compressed and sintered powdered material for use in sliding engagement with surfaces of other components, and to improved methods for making such articles. It is particularly directed to friction articles such as clutch facings and brake linings but also applicable for use in other applications where low wear rate and stability are important factors.

Metallic articles such as those referred to above are often formed of powdered material composed at least predominately of copper, and may also include one or more other materials such as zinc, tin, lead, aluminum and iron; the specific composition in any particular article depending upon the application in which it is to be used. Methods of compressing, forming, sintering and mounting sintered articles such as are here referred to are well-known to the art.

It is an object of the present invention to provide a sintered element or body having superior friction properties and superior wearing qualities.

It is another object of the present invention to provide a sintered element which has a relatively stable coefficient of friction which will vary only slightly with variations in temperature.

It is still another object of the present invention to provide a sintered rubbing element that is highly resistant to welding with the member that it contacts in operation thereby preventing possible scoring and rapid wear which otherwise would follow.

The accompanying drawing shows curves or plots representing the dynamic coefficient of friction under dry conditions between an iron plate and sintered bronze buttons comprising 90% copper and 10% tin and between buttons of the same type operated against the same iron plate after treatment according to this invention.

Today's large machines and high horsepower engines have created a demand for heavy duty friction materials for clutch facings and brake linings which will stand up under very extreme conditions. The present invention provides a sintered friction element which may be applied, for example, to a heavy duty tractor clutch and which will stand up under repeated use with less wear than clutch facings known in the past due to less local welding and galling between the friction elements and the mating pressure plate or flywheel of the tractor. The present improvements are based upon discoveries made in experiment with heavy duty clutches. It was found that when certain commercially available sintered materials were used in a heavy duty tractor clutch that the initial wear was very great. After the initial wear-in period, the clutch facings tended to stabilize and the rate of wear decreased materially.

The present improvements are based upon the discovery that by oxidizing a sintered frictional body the initial wear rate may be materially improved and a further improvement results when a high pressure coining operation is applied to increase the density of the part, particularly if it is done after the oxidizing process.

In carrying out our experiments, we re-sintered the commercially available sintered materials referred to above at 1200° F. for two hours in argon. Tests showed that this re-sintering did not cause any improvement as may be observed from the accompanying drawings and the chart hereinafter shown. It therefore can be said that improvement is due solely to the oxidizing process and that this gain is largely due to the ability of the oxidized buttons to restrict local welding and galling action between the friction material surfaces and the mating surfaces. It can also be observed from the accompanying drawings that the friction coefficient stability of the oxidized material is superior to that of the non-oxidized material.

In order that the invention may be clearly understood, a specific example of forming clutch facings in the form of buttons will be described. A bronze powder comprising approximately 90% copper and 10% tin is formed into a clutch button or disc under a pressure of approximately 20,000 to 40,000 pounds per square inch. The bronze button is then sintered at approximately 1475° F. in an inert or slightly reducing atmosphere. The button is then taken from the die and placed in a furnace having a normal furnace atmosphere at 1200° F. for approximately two hours. The furnace heat is then turned off and the furnace door opened and the button allowed to cool to a handling temperature. The button is then placed in a coining die and coined to a density of between 8.1 and 8.6 gms./cc. This requires a press pressure of between 180,000 and 200,000 lbs. per square inch. The button or disc is now ready for final fabrication and attachment to a clutch member providing proper thickness is obtained in the final coining operation. It was found necessary to reoxidize the sintered friction element for approximately 20 minutes for best results, if the original surface was disturbed by machining after assembly.

Before coining, the sintered and oxidized material has a density of approximately 6.3 gms./cc. and it was noted that the oxidizing operation on the sintered element (button or disc) before the extreme coining operation prevented galling of the dies or parts.

It has been found that the coefficient of friction of the above described material can be changed to some extent by increasing or decreasing the final coining pressure.

Our experiments have shown when the above described process is carried through the oxidizing step and before the coining step that the material at this step has superior wearing qualities to unoxidized material. Tests have indicated that initial wear is decreased as much as two-thirds. When the material is further subjected to the coining step, the initial wear is further decreased. In one typical clutch plate test, the total wear dropped from .0122 in. to .003 in., as shown in the chart below.

The test procedure comprised attaching buttons to a driven disc of a test machine, said disc being rotated between a pressure plate and flywheel for 200 cycles; each cycle consisting of 2.73 seconds engagement and 3.5 seconds disengagement. The speed was at 1,200 r.p.m. and the unit button pressure 74 p.s.i.

*Comparative wear—friction test*

| Button | Density, gms./cc. avg. | Wear in inches |
|---|---|---|
| Sintered powdered bronze comprising 90% Cu and 10% Sn | 6.23 | 0.0295 |
| Sintered powdered bronze comprising 90% Cu and 10% Sn, oxidized at 1,200° F. for 2 hrs. in air | 6.47 | 0.0122 |
| Sintered powdered bronze comprising 90% Cu and 10% Sn, re-sintered at 1,200° F. for 2 hrs. in argon | 6.42 | 0.0330 |
| Sintered powdered bronze comprising 90% Cu and 10% Sn, oxidized at 1,200° F. for 2 hrs. in air, coined at approximately 50 tons/in.², and surface oxidized at 1,200° F. for 20 mins | 8.1 | 0.003 |
| Sintered powdered bronze comprising 90% Cu and 10% Sn, oxidized at 1,200° F. for 2 hrs. in air, coined at approximately 80 tons/in.² and surface oxidized at 1,200° F. for 20 mins | 8.55 | 0.0025 |

Although all of the reasons for this superior performance of frictional material prepared in accordance with the above described process are not fully understood, it is believed that the oxidation step provides a layer of oxide on the face of the friction body. This oxide acts as a lubricant so that upon engagement of the clutch, facing material does not tend to locally weld to the abutting portion of the clutch as was true of samples of unoxidized material thereby causing wear by extreme galling. The coining process drives the oxide layer deeper into the body of friction material and makes a more dense structure, thereby providing a friction material which has superior wearing qualities. It is our opinion that part of these superior wearing qualities may be the result of less heat set (permanent compression under the high heat) of the friction button due to the clamping pressure. In this case it must be called apparent wear since the thickness decrease is not the result of sloughed off material even though the final results are the same. Also, the more dense material improves heat conductivity. However, if a high density material such as is produced by the coining process is not oxidized, it tends to weld when the clutch is operated during an initial wear-in period.

Although a preferred embodiment using a bronze material comprising 90% copper and 10% tin has been described tests indicate that the process described will produce satisfactory friction materials for various applications when this process is used on other sintered material composed at least predominately of copper. In addition to the copper, materials such as tin, zinc, lead, aluminum and iron may be used. Many of these will have improved wearing qualities if they are subjected to the oxidizing and coining steps described above.

It is contemplated that materials processed according to this invention may be used not only for dry clutch applications, but also wet clutch installations employing oil on the friction surfaces and also for other divergent purposes such as thrust washers, bearings and seals which also in most cases operate in the presence of some liquid on semi-liquid lubricant. In these cases the ability of this type material to provide improved resistance to scoring, seizing, or galling under boundary conditions should be particularly valuable.

It will be understood that the specific material and procedure which has been described for the purposes of illustration and explanation can be varied in the practice of the invention within the scope of the appended claims.

We claim:

1. The method of making friction bodies of oxidized sintered powders of bronze; the steps of forming a body of said powdered bronze then heating said body in an oxidizing atmosphere to form an oxidized film on its surface and coining said body in a die to thereby cause penetration of said oxide film and to thereby also form said body to a predetermined size.

2. The method of making friction bodies of powdered material consisting of copper alloy; the steps of forming the body of powdered copper alloy, and then heating said body in an oxidizing atmosphere to form an oxide film on its surface and coining said body in a die to thereby cause penetration of said oxide film.

3. A method as claimed in claim 1 in which the said body is re-oxidized again.

4. The method of making friction bodies of powdered material of copper alloy; the steps of forming the body from powders of copper alloy in a die, sintering said body in a non-oxidizing atmosphere, heating the body in an oxidizing atmosphere at approximately 1200° F. for approximately two hours thereby providing an oxide film, and then coining said body at a high pressure to thereby cause penetration of said oxide film and to thereby also form the said body to a predetermined size.

5. The method of making friction bodies of powdered material of a composition consisting of approximately 90% copper and 10% tin, including the steps of forming the body from powders of said composition in a die, sintering said body in a non-oxidizing atmosphere, heating the body in an oxidizing atmosphere to form an oxide film on the surface of said body, and coining said body in a die thereby causing penetration of said oxide film and to thereby form the said body to a predetermined size.

6. A method of making friction bodies of powdered copper alloy; the steps of forming the body from copper alloy powders in a die, sintering said body in a non-oxidizing atmosphere, heating the body in an oxidizing atmosphere at approximately 1200° F. for approximately two hours, coining the said body under high pressure to a density of at least 7 gms./cc., and then surface oxidizing the said body at approximately 1200° F.

7. A method as claimed in claim 1 in which the said bodies have a composition of approximately 90% copper and 10% tin.

8. A method as claimed in claim 7 in which the said coining is at a pressure of approximately 80 tons/in.$^2$.

References Cited by the Examiner

UNITED STATES PATENTS

| | | | |
|---|---|---|---|
| 1,575,122 | 3/26 | Madsen | 148—6.3 |
| 2,933,386 | 4/60 | Pessel | 75—224 |

FOREIGN PATENTS

| | | | |
|---|---|---|---|
| 440,197 | 12/35 | Great Britain | 148—6.3 |

OTHER REFERENCES

Goetzel: Treaties on Powder Metallurgy, vol. 2, Interscience Publishers, Inc., N.Y., 1950, pp. 437–443 and 471–497.

CARL D. QUARFORTH, *Primary Examiner.*

REUBEN EPSTEIN, *Examiner.*